INVENTOR.
GEORGE A. BOESGER

Jan. 22, 1952     G. A. BOESGER     2,583,039
DUST COLLECTOR

Filed June 1, 1949     3 Sheets-Sheet 2

INVENTOR.
GEORGE A. BOESGER
BY
Hudson, Broughton,
Williams, David & Hoffmann.
ATTORNEYS Jan. 22, 1952  G. A. BOESGER  2,583,039
DUST COLLECTOR Filed June 1, 1949  3 Sheets-Sheet 3

INVENTOR.
GEORGE A. BOESGER
BY Hudson, Boughton,
Williams, David & Hoffmann.
ATTORNEYS Patented Jan. 22, 1952

2,583,039

UNITED STATES PATENT OFFICE 2,583,039

DUST COLLECTOR

George A. Boesger, North Olmsted, Ohio, assignor to The W. W. Sly Manufacturing Company, Cleveland, Ohio, a corporation of Ohio Application June 1, 1949, Serial No. 96,426

7 Claims. (Cl. 183—61)

This invention relates to improvements in dust collectors, that is to say apparatus for removing dust from dust laden air, either for the purpose of purifying the air or for the purpose of recovering values in the dust, or both.

One form of apparatus employed for this purpose embodies a series of porous fabric bags through which the air is drawn and by which the dust is filtered out. In the use of such equipment the pores of the bags tend to become clogged after a period of time, the length of which depends upon the particular service. It is necessary therefore to interrupt the operation of the apparatus at intervals in order to shake the dust loose from the bags or otherwise remove it.

In accordance with the present invention the operation of the apparatus is continuous, and the bags are cleaned one at a time by a reverse current of air which flows in a direction opposite to that of the main current, due to the fact that the pressure in the reverse current is greater than that in the main current.

One of the objects of the invention is the provision of means for cleaning the porous fabric bags of a dust collector one by one by means of a travelling carriage to which is connected a conductor that directs the reversely flowing air through the bags.

Another object is the provision of means for employing atmospheric air for the reverse current.

A further object is the provision of means for selecting by a simple adjustment either atmospheric air or air at greater than atmospheric pressure for the reverse current flow.

Still another object is the provision of electrical means for automatically reversing the direction of movement of the travelling carriage as it reaches the ends of its path of travel.

Another object is the provision of means for stopping the operation of the apparatus completely in the event that the traveling carriage should fail to make a complete traverse within a predetermined period of time.

Other objects and features of novelty will appear as I proceed with the description of that embodiment of the invention which, for the purposes of the present application, I have illustrated in the accompanying drawings, in which Fig. 1 is a front elevational view of apparatus which may be employed in carrying out the invention, the forward wall of the casing being removed to better illustrate the invention, and the view being taken substantially along the line 1—1 of Fig. 2.

Figure 1:
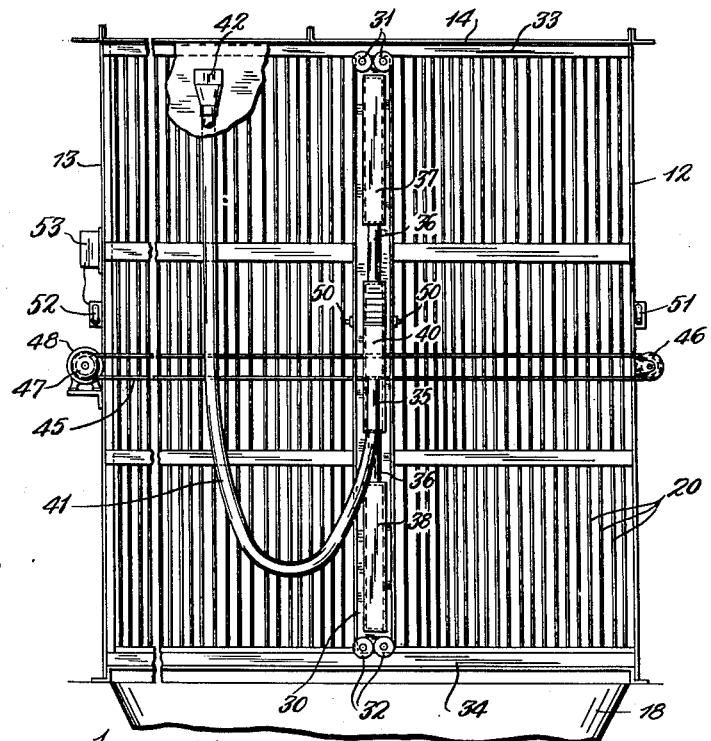
Figure 2:
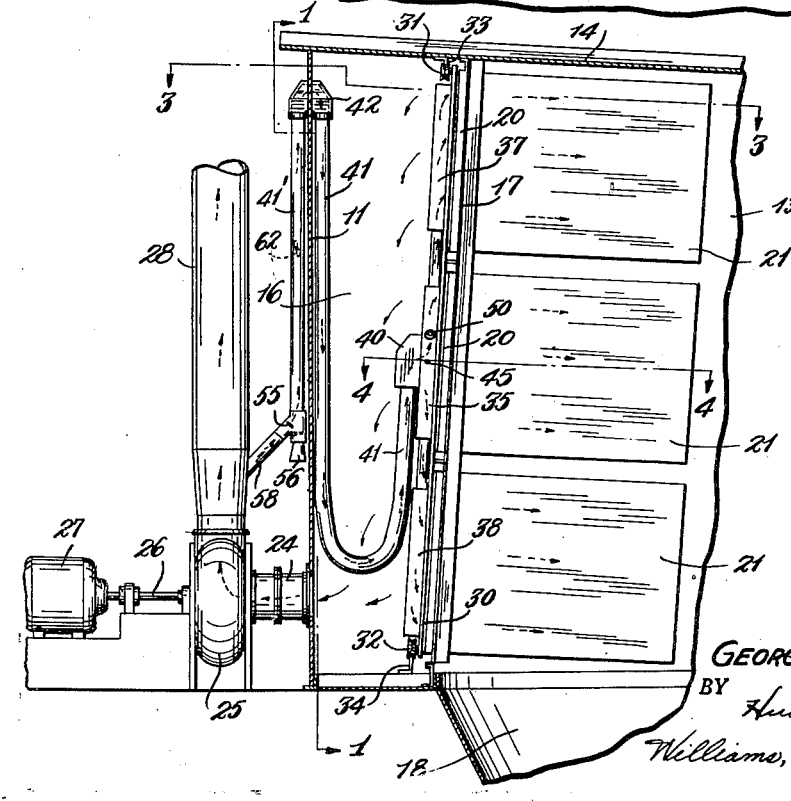
Fig. 2 is a side elevational view of the same with a side wall of the casing removed.

In the drawings the apparatus is disclosed as embodying a substantially air-tight casing having a rear wall 10, a front wall 11, side walls 12 and 13 and a cover or roof 14. The casing is divided into a dust chamber 15 and a clean air chamber 16 by a transverse partition wall 17. A dust hopper 18 of conventional form communicates with the dust chamber 15. The transverse wall 17 is provided with a series of narrow vertical openings 19 which are bordered by forwardly extending flanges 20 that surround the openings and the forward edges of which lie in a common plane.

In the illustrated embodiment there are three series or tiers of narrow porous fabric bags 21, the bags of each series being disposed side by side and their forward open ends being connected by any suitable means with the transverse wall 17 surrounding the several openings 19. It should be understood of course that less than or more than three tiers of bags may be employed in any given unit as the requirements of a particular installation may dictate. As is common in the art each of the bags is provided with an internal wire frame, not shown, to prevent the collapse of the bag and assist in supporting it.

Connected with the dust chamber 15 there is an intake pipe 23 for dust laden air. In the wall 11 at the front of the casing there is an opening communicating with a conductor 24 which leads to the intake of a blower 25 driven by means of a shaft 26 from an electric motor 27. The blower exhausts through a conductor 28. When the apparatus is in operation blower 25 maintains a sub-atmospheric pressure in clean air chamber 16 and in dust chamber 15, whereby dust laden air enters the apparatus through pipe 23, is filtered by the bags 21, passes into the clean air chamber 16 and is exhausted through the conductor 24, blower 25 and exhaust conductor 28. The dust which is removed and falls from the bags 21 collects in the hopper 18.

Running over the flanges 20 in close contact therewith so as to minimize air leakage, there is a diaphragm 30 mounted on a travelling carriage. At its upper and lower ends this carriage has wheels 31, 32 which run upon tracks 33, 34 extending across the casing from one side to the other. Midway of its length this diaphragm carries an air-tight housing 35, and at the upper and lower ends this housing is connected by conductors 36 with similar housings 37 and 38 also mounted on the diaphragm. Through the diaphragm opposite each of the housings 35, 37 and 38, there is an elongated opening 39, Fig. 4, which is adapted to register at times with each of the openings 19 through the transverse partition wall and hence with the respective bags.

Housing 35 may include an angular connection 40 from which there extends a flexible tubular conductor or hose 41. The opposite end of this tubular conductor extends into a hollow bridge member 42 mounted in the casing wall 11 and providing a passage for air into the tubular conductor 41 from a tubular conductor 41' extending downwardly on the outside of the casing. The bridge member 42 is mounted in the front wall 11 near the central point of the horizontal travel of diaphragm 30.

An endless chain or cable 45 extends across the chamber 16 in front of the partition wall 17. It runs over a sheave 46 mounted on wall 12, preferably outside the casing, and over a pulley 47 mounted on the shaft of a reversible electric motor 48 which is supported on the wall 13 outside the casing. The two runs of this endless connector may extend through small openings in the side walls of the casing. The ends of the chain or cable are secured to the sides of some part of the travelling carriage, as for example the housing 35. Obviously, when the motor 48 turns in one direction the diaphragm 30 will travel toward the left, and when it turns in the opposite direction the diaphragm will travel toward the right.

In order to reverse the current through the motor 48 when the diaphragm reaches one end of its travel, the diaphragm may carry opposed projections 50 which are adapted to strike the operating levers on limit switches 51, 52 mounted on the respective casing walls 12 and 13.

As a further control I provide an electric timer mechanism designated generally by the reference numeral 53, which is so constituted and so connected in the electrical system of the apparatus that it will open the circuits of both of the motors 27 and 48 in the event that the diaphragm carriage fails to travel through a complete reciprocation back and forth within a period of time that is normally more than sufficient for the purpose.

Figure 5:
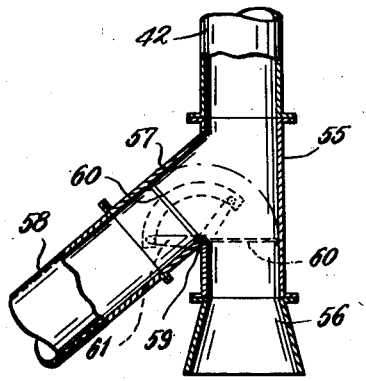
Fig. 5 is a detail sectional view of a valve for selecting reverse current air either from atmoshere or from the discharge of the blower.

At the bottom of the conductor 42 outside the casing I provide a Y connection 55, one branch 56 of which is open to atmosphere, see Fig. 5. The other branch 57 is connected by a conductor 58 with the exhaust pipe 26 from blower 25. In the Y connection 55 there is mounted a shaft 59 which constitutes the pivot for a gate valve 60 that is operable by a crank 61 to assume either the full line position which closes off conductor 58 or the broken line position indicated at 60' which closes off the atmosphere branch 56. This valve may also be adjusted to intermediate positions if desired for mixing atmospheric air with exhaust from blower 25 so as to regulate the pressure of the reverse air above atmospheric pressure. In addition to this selective or mixing valve I provide a valve 62 of the butterfly type in conductor 42 on the downstream side of the Y connection by means of which the volume of air flowing to the diaphragm passages may be controlled.

Figure 6:
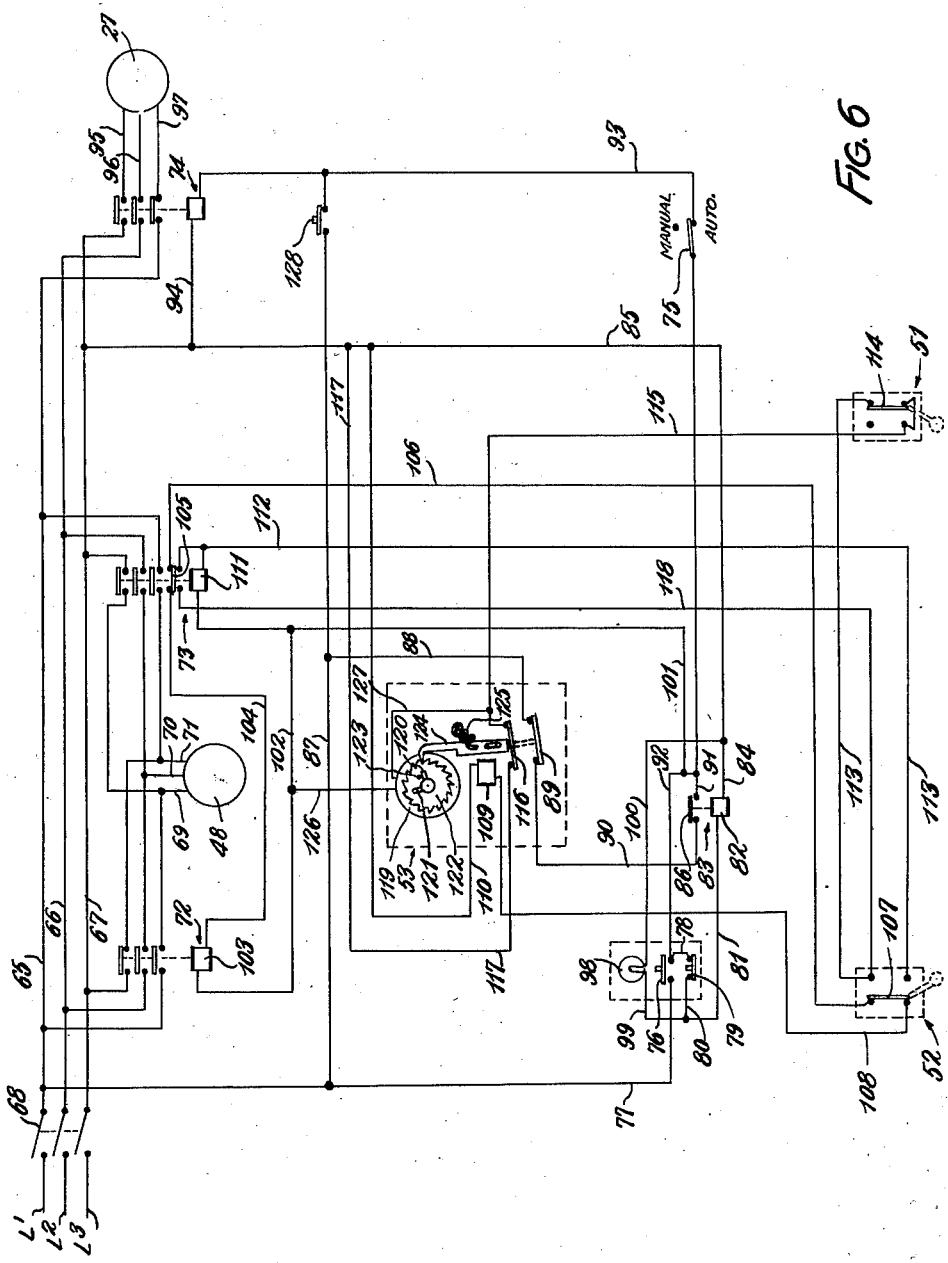
Fig. 6 is a wiring diagram.

The simplified wiring diagram of Fig. 6 shows provision for the supply of power to operate the carriage and fan motors 48 and 27, respectively, as well as to control the operation of these motors from a source of 3-phase, alternating current, electrical energy represented by the power supply lines L1, L2 and L3. These power supply lines are connectible with the wires 65, 66 and 67 by means of a suitable disconnect switch or circuit breaker, generally designated 68. Wires 65, 66 and 67 are respectively connectible with the leads 69, 70, and 71 for the motor 48 under control of a relay, generally designated 72, to thereby effect movement of the carriage in one direction. The leads 69, 70 and 71 of the motor 48 are also selectively connectible respectively with the power lines 67, 66 and 65, respectively, under control of a second relay, generally designated 73, for effecting movement of the carriage in the opposite direction. Control of the energization of the relays 72 and 73 is effected jointly through the previously mentioned limit switches 51, 52 and the timing mechanism 53 in a manner about to be described. The fan motor 27 is energized under control of a relay 74 either in conjunction with energization of the carriage motor 48 or independently thereof, as may be desired.

The nature of the wiring circuit illustrated in Fig. 6 will best be understood from a description of the mode of operation. For convenience, let it be assumed that the carriage is at a point intermediate the two limit switches 51 and 52 and that the fan 27 is to be automatically energized upon energization of the carriage motor 48. The operator will first place the selector switch 75 in the position marked "Auto," as indicated in Fig. 6, and move the switch 68 to circuit closing position. He next momentarily depresses the start button 76 thereby completing a circuit extending from the wire 65 through a wire 77, the now depressed switch 76, wire 78, normally closed stop switch 79 and wires 80, 81 to one terminal of the coil 82 of a holding relay generally designated 83. The circuit is completed from the other terminal of the coil 83 through wire 84 and a wire 85, the latter being connected with the main power line 67.

The resulting energization of relay 83 closes its contact 86. This provides a holding circuit about the start switch 76 so that the latter may now be released. This holding circuit extends from the wire 77 through the wires 87, 88, contact 89 of the timing device 53, wire 90, the now closed contact 86 of relay 83, the circuit continuing through the wires 91, 92, 78, stop switch 79, wire 81, coil 82, and wires 84, 85 to the wire 67. A circuit is also completed from wire 91 through the selector switch 75, to one terminal of the coil of the fan relay 74, the circuit being completed to the wire 67 from the other terminal of this coil through the wires 94 and 85. Therefore, in addition to providing a holding circuit, the energization of relay 83 has also energized the relay 74, thereby moving its contacts to closed position and thus connecting the wires 65, 66 and 67 with the leads 95, 96 and 97 for the motor 27, so that the fan is placed in operation. The fact that the relay 83 is energized is indicated by illumination of a signal lamp 98, the circuit therefor extending from the wire 80 through a wire 99 to one terminal of the lamp and from the other terminal of the lamp through a wire 100 to a connection with the wire 84.

The limit switches 51 and 52 are such that their movable contacts are respectively urged to one circuit closing position, as shown in Fig. 6, and are moved from that position to the other position thereof only when the carriage engages the roller on the end of the actuating arm of the corresponding switch, the switches returning to their initial position as soon as the carriage moves from contact therewith. Therefore, with the carriage intermediate the switches, the latter will be disposed as shown in Fig. 6. Consequently, the forward relay 72 is energized through a circuit extending from the wire 65 through wires 77, 87, 88, contact 89, wire 90, contact 86 of relay 83, wires 91, 101 and 102 to one terminal of the coil 103 of the relay 72. This circuit continues from the other terminal of the coil 103 to a wire 104 and through a contact 105 of the relay 73, when the latter is deenergized, to a wire 106, thence through the movable contact element 107 of the switch 72 to a wire 108 which is connected to one terminal of the coil 109 in the timing mechanism 53. The circuit is completed from the other terminal of the coil 109 through a wire 110 which is connected to the wire 65 and hence to the power wire 67. The energization of coil 103 of the relay 72 moves its contacts to circuit closing position thereby connecting the motor leads 69, 70 and 71 with the wires 65, 66 and 67 so that the carriage motor 48 is energized for rotation in the direction which moves the carriage towards the switch 52.

When the carriage has engaged and actuated the switch 52, the contact 107 thereof is moved from the position shown, thereby opening the circuit between the wires 106 and 108 deenergizing the coil 103 of the relay 72 and consequently deenergizing the carriage motor 48 so that the carriage stops. The fan motor 27, however, remains in operation. The just-mentioned operation of the switch 52 has, however, closed a circuit energizing the reverse relay 73, this circuit extending from the closed contact of the holding relay 82 through the wires 91 and 101 to one terminal of the coil 111 of the relay 73. This circuit continues from the other terminal of the coil 111 through a wire 112, the contact 107 of switch 52 which is now in engagement with the terminal connected to the wire 112, thence to a wire 113, through the movable contact 114 of the switch 51, to and through a wire 115 which is connected to movable contact 116 of the timer 53. The circuit is completed from the contact 116 through a wire 117, which is connected to the wire 85, and through the latter to the power wire 67. The coil 111 is therefore energized so that the relay 73 moves its contacts to circuit closing positions for energizing the motor 48 in the reverse direction since the power wires 65, 66 and 67 are now connected with the motor leads 71, 70 and 69, respectively. Also, the energization of the relay 73 has moved the contact 105 thereof from its position shown in Fig. 6 to a position engaging the contacts illustrated immediately therebelow. This opens the circuit between the wires 104 and 106 preventing improper or inadvertent operation of the forward relay 72 and at the same time the contact 105 provides a holding circuit for the relay 73, this holding circuit extending from the wire 112 through the contact 105 to the wire 118 which is connected to the wire 113 and hence, through the previously described circuit, to the power wire 67.

Consequently, when the contact 107 of switch 52 returns to its position illustrated in Fig. 6, which happens as soon as the carriage begins moving to the right, the energization of the relay 73 controlling movement of the carriage in this direction is maintained through the previously mentioned holding circuit. The carriage will therefore continue to move towards the switch 51, that is to the right as viewed in Fig. 6, until the carriage engages and operates the switch 51. Upon such engagement, contact 114 is moved from its position shown in Fig. 6 thereby opening the holding circuit therethrough for the reverse relay 73 deenergizing the latter and thereby deenergizing the motor 48.

The deenergization of the relay coil 111 restores the contact 105 to its position as shown in Fig. 6, thereby restoring the circuit for energization of coil 103 of relay 72, as was previously described, with the result that the motor 48 is again energized for rotation in a direction moving the carriage towards the switch 52. Since this energization of the relay 72 and hence of the motor 48, is not dependent upon circuits extending through the left-hand contacts of the limit switch 51, as viewed in Fig. 6, no holding circuit is required to maintain the motor in operation after it moves from engagement with the switch 51. Moreover, since the actuation of the switch 51 had deenergized the coil 111 of relay 73, the holding circuit through the contact 105 thereof was broken and this relay cannot be reenergized again until the carriage reaches and operates the switch 52, since the energizing circuit for the coil 111 of relay 73 is open at the contact 107.

It will be apparent, therefore, that in the normal operation of the device the carriage continuously moves backwardly and forwardly between the limit switches 52 and 51 with the fan 27 in continuous operation. Provision is made in the circuit, however, for stopping the motor 48 of the carriage in the event it fails to complete one complete reciprocatory movement within a predetermined length of time and it is for this purpose that the timing mechanism 53 is provided.

For the purposes of this disclosure it is sufficient to note that the timing mechanism 53 comprises a motor 119, which through reduction gearing drives a shaft which is provided with two arms 120 and 121. These arms are normally locked together for movement with the shaft but the timing of the device may be set by pulling one of the arms outwardly and turning it to a new setting thereby changing the angular spacing between the arms which represents the selected time interval. Upon restoring the adjusted arm to its inward position, the arms are again locked together. A ratchet wheel 122 is loose upon the motor shaft. This wheel has a stop pin 123 which is normally held against one of the arms, such as 120, by a reset spring, not shown, disposed between the wheel and the motor shaft. Adjacent the ratchet wheel 122 is a pawl member 124 which is mounted for limited pivoting movement and longitudinal movement by means of a fixed pin within a slot of the pawl member, the latter being urged to a position in which it is free of engagement with the ratchet wheel 122, and of the contact 116, by a tension spring 125. This pawl member 124 is adapted to be engaged with the ratchet wheel 122 by energization of the previously mentioned coil 109 and the pawl member is adapted, as presently described, to open the circuits extending through the contacts 89 and 116 by engaging and moving the latter, which are connected for movement together, in the event the coil 109 is not deenergized within the preselected period of time.

The motor 119 is energized through a circuit extending from the wire 102 through a wire 126 to one terminal of the motor, the other terminal being connected by a wire 127 to the wire 115 so that the circuit is completed through the contact 116 and the wires 117 and 85 to the power wire 67. Consequently, the motor 119 is energized under control of the holding relay 83 and remains in continuous operation so long as the holding relay remains energized. This would normally produce rotation of the ratchet wheel 122 together with the arms 120 and 121. However, it will be observed that, with the switches disposed as shown in Fig. 6, the coil 109 is also energized. This moves pawl member 124 into engagement with the ratchet wheel 122 holding the latter from rotation so that the arms 120 and 121 rotate relative thereto. As soon as the carriage engages and operates the switch 52, however, the circuit through the contact 107 thereof, by which the coil 109 of the timer is energized, is broken thereby deenergizing the coil releasing the pawl member from the ratchet wheel so that the latter is reset to engage the pin 123 with the arm 120 by means of the spring, not shown. This begins a new timing cycle.

Preferably the angular space between the arms 120, 121 is so set that the time required to rotate the arm 121 into engagement with the pin 123 on the ratchet wheel 122, when the latter is held stationary by means of the pawl member 124, exceeds slightly the time required for a complete reciprocation of the carriage from the switch 52 to the switch 51 and back again to switch 52. Consequently, in normal operation of the device, the carriage by its movements will deenergize coil 109 of the timing mechanism once during each complete reciprocation, and hence before arm 121 engages pin 123, so that the circuits through the contacts 89 and 116 of the mechanism remain closed. However, if the carriage should fail to make a complete reciprocation within the predetermined time, the switch 52 is not actuated for deenergization of the coil 109 before the arm 121 has engaged the pin 123. When this engagement occurs, the continued rotation of the arm 121 tends to produce a partial rotation of the ratchet wheel 122, thereby forcing the pawl member 124 downwardly, as viewed in Fig. 6, so that this member engages and opens the contacts 116 and 89. Opening of these contacts breaks the holding circuit for the relay 83 and the energizing circuit for the motor 119 of the timing apparatus, thereby deenergizing the carriage motor 48, the fan motor 27, and the timing mechanism 53.

To restart the apparatus, after it has been stopped by operation of the timing mechanism, it is necessary to again depress the start switch 76 and, if the condition which caused the timing mechanism to operate has not been corrected so that the carriage again fails to make a complete reciprocation in the predetermined time, the apparatus will again stop as just described. When, however, the carriage completes its reciprocation within the predetermined time, the timing mechanism does not operate to stop the device but instead is automatically reset, as previously described, for a new timing operation. Stopping of the apparatus may be effected at any desired time by momentarily depressing the stop switch 79 thereby breaking the circuits through relays 83 and 74 and that one of relays 72 and 73 then energized.

In some instances it is desirable to have the fan 27 operate without reciprocation of the carriage. For this type of operation the selector switch 75 is moved from the position shown in Fig. 6 to a position engaging the unwired contact marked "Manual." This opens the circuit for energization of the fan motor 27 through the holding relay 83. The fan motor may, however, now be energized by operation of a manual start button 128 which closes a circuit from the power wire 65 through the wires 77 and 87 to the wire 93 thence through the coil of the fan relay 74 and the wires 94 and 85 to the power wire 67. Consequently, the fan relay 74 is energized energizing the fan motor 27. It will be understood that the fan motor 27 will remain energized in this manner only so long as the start switch 128 is held in circuit closing position, but if desired the start switch 128 may be provided with a conventional ferrule or collar for maintaining the latter closed if desired. This feature being conventional is not illustrated and, likewise, for simplicity conventional protective devices such as current overload switches, fuses, and the like, have been omitted.

Figure 3:
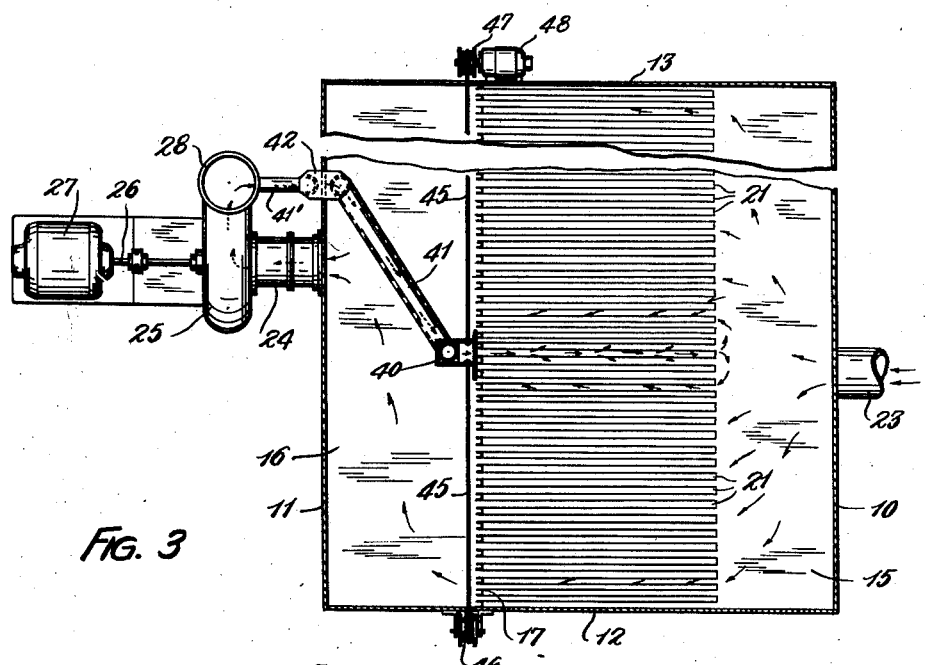
Fig. 3 is a horizontal sectional view taken substantially on the line 3—3 of Fig. 2.
Figure 4:
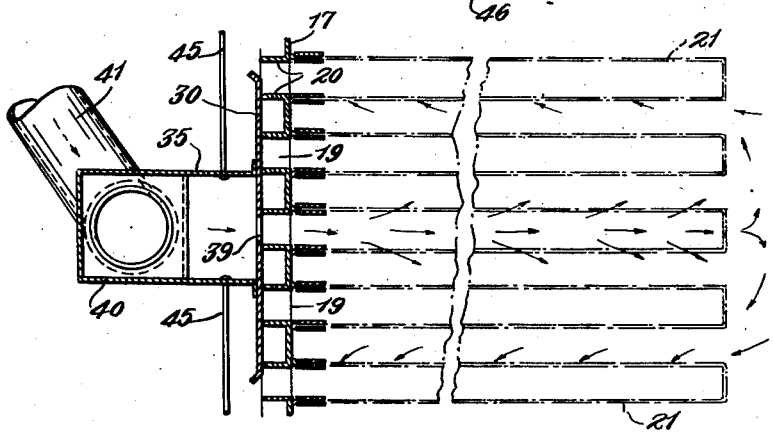
Fig. 4 is a fragmental horizontal sectional view on a larger scale, the view being taken substantially on the line 4—4 of Fig. 2.

The operation will be evident from the above description of the apparatus. As indicated in Fig. 3 dust-laden air will flow through the chamber 15 and pass from the outside to the inside of the various bags 21. The dust is filtered out by the porous fabric of these bags and the clean air emerges from the open ends of the bags into the clean air chamber 16, passing thence through the blower 25 and out through the clean air exhaust 28. This flow of air is prevented however through those bags which are masked off by the diaphragm 30. As shown in Fig. 4 there are three such bags, the center one of which is registered with the opening 39 through the diaphragm. Reverse air passes through the latter bag as indicated by the arrows of that figure. The pressure of this reverse air is greater than that prevailing in the chamber 15, because its pressure is at least atmospheric whereas that in chamber 15 is sub-atmospheric. The reverse air, the pressure of which may be regulated to suit particular requirements as previously explained, dislodges the dust which is collected on the exterior surfaces of the bag causing it to drop downwardly through the chamber 15 into the hopper 18.

The carriage on which is mounted the diaphragm 30 travels slowly across the casing causing opening 39 to register with each of the bags 21 one after another, so that each one is cleaned for every traverse of the carriage from one side of the casing to the other. The flexible conductor or hose 41 is long enough to follow the carriage throughout its travel, it being understood that the bridging connection 42 is located near the mid-point of travel. The blocking off by the diaphragm 30 of a bag on either side of the bag being cleaned, leaves a space on each side of the latter bag which is occupied by more or less dead air, so that the dust dislodged readily falls instead of being carried at once against another bag.

The traverse of the carriage back and forth continues indefinitely so long as the control switch 68 is closed unless some difficulty arises which interrupts the carriage travel. If this occurs timer 53 functions to lower the contacts 116 and 89, whereupon all circuits are broken and current ceases to flow through motors 27 and 48 and the timer motor 119. Signal lamp 98 goes out and the apparatus as a whole ceases to function until the difficulty is corrected.

Having thus described my invention, I claim:
1. In a dust collector, a casing, a wall dividing said casing into a dust chamber and a clean air chamber, a plurality of porous bags in said dust chamber arranged side by side in a horizontal series with their open ends attached to said wall in communication with openings through the wall, an inlet to said dust chamber for admission of dust-laden air, a blower having its intake connected with said clean air chamber, a diaphragm in the latter chamber having an opening adapted to register with said wall openings one at a time, means for traversing said diaphragm back and forth from one end of said wall to the other, and means for maintaining communication between said diaphragm opening and air outside the casing comprising a flexible tubular conductor connected to the diaphragm at one end and communicating with an opening through the casing at its opposite end.

2. A dust collector as defined in claim 1, wherein said means for traversing said diaphragm comprises an endless flexible connector extending transversely of said casing parallel to said dust wall, both runs of said connector passing through openings in a side wall of the casing, a rotary driving member for said endless connector disposed exteriorly of said casing wall, and automatic means for reversing the direction of rotation of said driving member as said diaphragm reaches either end of its travel.

3. A dust collector as defined in claim 1, wherein said means for traversing said diaphragm comprises an endless flexible connector extending transversely of said casing parallel to said dust wall, a reversible electric motor disposed outside said casing and operatively connected to said endless connector for driving it in either direction, limit switches on both side walls of said casing, and means moving said diaphragm for operating one or the other of said limit switches as the diaphragm reaches the limit of its travel in either direction, and electrical connections controlled by said limit switches for reversing the current through said motor.

4. In a dust collector, a casing, a wall dividing said casing into a dust chamber and a clean air chamber, a plurality of porous bags in said dust chamber arranged side by side in a horizontal series with their open ends attached to said wall in communication with openings through the wall, an inlet to said dust chamber for admission of dust-laden air, a diaphragm in said air chamber having an opening adapted to register with said wall openings one at a time, means for traversing said diaphragm back and forth from one end of said wall to the other, a blower having its intake connected to said clean air chamber for subjecting the latter to sub-atmospheric pressure, a flexible tubular conductor connected with the opening in said diaphragm and extending outside of said casing, the exterior portion of said conductor having a Y connection, one branch of which leads to atmosphere and the other branch of which is connected with the discharge of said blower, and valve means for bringing one or the other of said branches into communication with said conductor.

5. In a dust collector, a casing, a wall dividing said casing into a dust chamber and a clean air chamber, a plurality of porous bags in said dust chamber arranged side by side in a horizontal series with their open ends attached to said wall in communication with openings through the wall, an inlet to said dust chamber for admission of dust-laden air, a diaphragm in said clean air chamber having an opening adapted to register with said wall openings one at a time, means for traversing said diaphragm back and forth from one end of said wall to the other, a blower having its intake connected to said clean air chamber for subjecting the latter to sub-atmospheric pressure, a flexible tubular conductor connected with the opening in said diaphragm and extending outside of said casing, the exterior portion of said conductor having a Y connection, one branch of which leads to atmosphere and the other branch of which is conected with the discharge of said blower, and valve means for apportioning the flow of air from said branches into said conductor.

6. A dust collector as defined in claim 5, comprising means in said conductor exterior of said casing but on the downstream side of said valve for regulating the flow of air to said diaphragm.

7. A dust collector as defined in claim 1, wherein said means for traversing said diaphragm comprises an endless flexible connnector extending transversely of said casing parallel to said dust wall, means operatively connected with said endless connector for driving it in either direction, a timer having a period somewhat greater than the time required for a complete traverse of said diaphragm, and electrical control means, set in motion by said timer upon failure of said diaphragm to complete a traverse within said timer period, for interrupting the operation of said blower.

GEORGE A. BOESGER.

REFERENCES CITED

The following references are of record in the file of this patent:

UNITED STATES PATENTS

| Number | Name | Date |
|---|---|---|
| 1,538,292 | Lindsay | May 19, 1925 |
| 1,949,540 | Hammond | Mar. 6, 1934 |
| 2,318,395 | Hornbrook | May 4, 1943 |
| 2,391,534 | Yerrick et al. | Dec. 25, 1945 |
| 2,476,942 | Arnold | July 19, 1949 |
| 2,507,335 | Donohue | May 9, 1950 |

FOREIGN PATENTS

| Number | Country | Date |
|---|---|---|
| 548,298 | France | Oct. 17, 1922 |